March 22, 1960 J. M. CLUWEN 2,929,997
TRANSISTOR AMPLIFIER
Filed March 13, 1956

INVENTOR
JOHANNES MEYER CLUWEN
BY [signature]
AGENT

United States Patent Office 2,929,997
Patented Mar. 22, 1960

2,929,997

TRANSISTOR AMPLIFIER

Johannes Meyer Cluwen, Eindhoven, Netherlands, assignor, by mesne assignments, to North American Philips Company, Inc., New York, N.Y., a corporation of Delaware Application March 13, 1956, Serial No. 571,304

Claims priority, application Netherlands April 16, 1955

5 Claims. (Cl. 330—18)

This invention relates to transistor amplifiers comprising two transistors, of which the emitter-collector paths are traversed in series by the direct supply current. An object is to provide amplifiers of satisfactory stability and low distortion.

A problem usually of primary importance in transistor amplifiers is the stabilization of the operating point of the transistors, since it has been found that the direct collector current, if no precautions are taken, varies with temperature. This prevents the operation of the transistor at the optimum value of its "operating" current. It is known to utilize either an emitter resistor, bypassed, if desired, or a collector-base resistor for stabilizing the operating point.

The invention combines in a simple manner means for producing the control signal of the second transistor and means for stabilizing the operating points of the two transistors. In accordance with the invention, the voltage across a resistor included between the collector of the first transistor and the emitter of the second transistor provides not only a signal current for controlling the second transistor, but also a stabilizing current for stabilizing the operating points of the transistors.

In order that the invention may be readily carried into effect, two embodiments will now be described, by way of example, with reference to the accompanying drawing.

Figure 1:
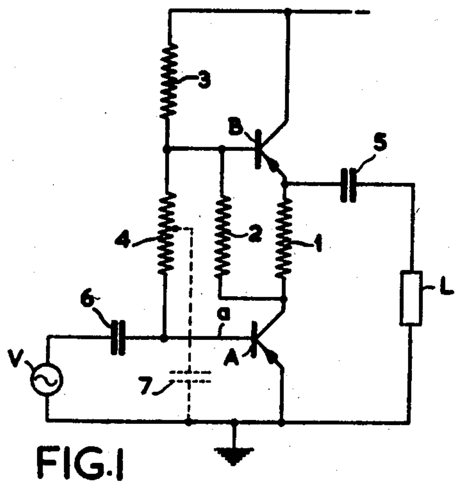

The amplifier comprises two transistors A and B, of which the emitter-collector paths in Fig. 1 are traversed in series by the direct supply current flowing to a minus terminal. Signals for a source V are supplied via a blocking capacitor 6 to the base of transistor A, whereas the signal current for transistor B is produced by means of the voltage across a resistor 1 included between the collector of transistor A and the emitter of transistor B. Said voltage is applied via a resistor 2 to the base of transistor B, which furthermore is connected via a resistor 3 to the minus terminal of the source of supply and via a resistor 4 to the base of transistor A. The resistors 1, 2, 3 and 4 have values which increase in the said sequence, for example, 200 ohms, 1 kilohm, 4 kilohms and 40 kilohms, respectively. A load impedance L is connected, if necessary via a blocking capacitor 5 to prevent the adjustment of the operating point from being influenced, between the emitter of transistor B and a terminal of the source of supply.

The signal source V produces an alternating collector current in transistor A, which is supplied via resistor 1 to the load impedance L, the signal voltage across said resistor producing in transistor B an alternating emitter current which is likewise supplied and with the same phase to the load impedance L. A considerable compensation of distortion of the two alternating currents may be obtained by proper adjustment of the resistors 1 and 2.

A small variation in the direct collector current and hence in the operating points of the transistors results in a corresponding voltage variation across resistor 1 and current variation through resistor 2. Owing to the comparatively low value of resistor 2, the direct current traversing it is considerably higher than the direct base currents, but still considerably smaller than the direct collector currents of the transistors A and B. Consequently, the variation in the current through resistor 2 results, inter alia by proper choice of resistor 3, in material variation in the direct base currents of the transistors A and B, in such a sense that it counteracts said variation in the direct collector current. The resistor 4, which normally adversely affects the stabilization of transistor A, may now be given a comparatively high value (40 kilohms) in order to ensure a sufficiently high collector-emitter direct voltage for transistor A (for example a little less than half the supply voltage), but said value must be smaller than $\alpha_{cb} \cdot R_3$, wherein $\alpha_{cb}$ represents the collecter-base current gain factor of transistor A (for example=50) and $R_3$ represents the value of resistor 3 (4 kilohms). The resistor 4 also brings about a signal feedback dependent upon the internal resistance of the source V. The feedback may be suppressed, if desired, by connecting, for example, a tapping point on resistor 4 via a bypass capacitor 7 to ground (as shown in dotted line) or by including the source V in the lead *a* between the base of transistor A and the junction of capacitor 6 and resistor 4.

Figure 2:
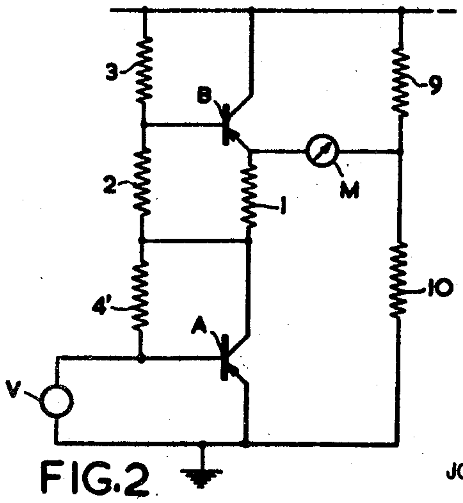

In the embodiment shown in Fig. 2, the resistors 1, 2 and 3 are connected to transistors A and B in a manner other than in Fig. 1. The connection between the two bases is via the series-combination of the resistors 2 and 4. The resistors 2 and 4 preferably have about equal values, viz. $R_2=\alpha R_4$, wherein $\alpha$ represents the collector-emitter current amplification factor of the transistors. From the calculation it then follows that the voltage on the emitter of transistor B does not vary with temperature, use being made of the recognition that, since the two transistors A and B are adjusted to substantially equal collector currents, the capacity of the two transistors to convey current from the emitter to the collector increases with temperature to approximately the same extent. The transistors A and B are incorporated in common, for example, in a small copper block, so that they have exactly the same temperature.

This arrangement is thus particularly suitable for direct voltage amplification with drift compensation, the signal of source V, after being amplified, being indicated by a current meter M included between the emitter of transistor B and a voltage divider 9, 10 which compensates for the drift of the meter with variations in supply voltage. A similar drift compensation of the transistors may also be obtained by connecting a resistor in series with the base connection of transistor B.

What is claimed is:

1. An amplifier circuit arrangement comprising first and second transistors of the same conductivity type each having emitter, collector and base electrodes, a first resistor, a direct current conductive circuit path connecting the collector electrode of said first transistor with the emitter electrode of said second transistor, said first resistor being included in series in said circuit path, means for applying a supply voltage across the series arrangement of said first and second transistors and said first resistor, means for applying input signals to the base electrode of said first transistor thereby producing a signal voltage across said first resistor, a direct voltage variation being produced across said first resistor by direct collector current variation in said first transistor, a second resistor, means connecting the base electrode of said second transistor to the collector electrode of said first transistor directly through said second resistor, a third resistor connected to the base electrode of said second transistor, means for applying a supply voltage to said third resistor, a fourth resistor, and a connection between the base electrodes of said first and second transistors, said connection including said fourth resistor, and means for deriving an output signal from the emitter-collector path of said second transistor.

2. An amplifier circuit arrangement comprising first and second transistors of the same conductivity type each having emitter, collector and base electrodes, a first resistor, a direct current conductive circuit path connecting the collector electrode of said first transistor with the emitter electrode of said second transistor, said first resistor being included in series in said circuit path, means for applying a supply voltage across the series arrangement of said first and second transistors and said first resistor, means for applying input signals to the base electrode of said first transistor thereby producing a signal voltage across said first resistor, a direct voltage variation being produced across said first resistor by direct collector current variation in said first transistor, a second resistor, means connecting the base electrode of said second transistor to the collector electrode of said first transistor directly through said second resistor, a third resistor connected to the base electrode of said second transistor, means for applying a supply voltage to said third resistor, a fourth resistor, a connection between the base electrodes of said first and second transistors, said connection including said fourth resistor, and a load impedance connected to the emitter electrode of said second transistor, said resistors having selected resistance values such that distortions in signal currents flowing from said transistors through said load impedance substantially compensate each other.

3. An amplifier circuit arrangement comprising first and second transistors of the same conductivity type each having emitter, collector and base electrodes, a first resistor, a direct current conductive circuit path connecting the collector electrode of said first transistor with the emitter electrode of said second transistor, said first resistor being included in series in said circuit path, means for applying a supply voltage across the series arrangement of said first and second transistors and said first resistor, means for applying input signals to the base electrode of said first transistor thereby producing a signal voltage across said first resistor, a direct voltage variation being produced across said first resistor by direct collector current variation in said first transistor, a second resistor, means connecting the base electrode of said second transistor to the collector electrode of said first transistor directly through said second resistor, a third resistor connected to the base electrode of said second transistor, means for applying a supply voltage to said third resistor, a fourth resistor, and means connecting the base electrodes of said first and second transistors through said fourth resistor, said fourth resistor having a relatively higher resistance value than said third resistor, said third resistor having a relatively higher resistance value than said second resistor and said second resistor having a relatively higher resistance value than said first resistor, and means for deriving an output signal from the emitter collector path of said second transistor.

4. An amplifier circuit arrangement comprising first and second transistors of the same conductivity type each having emitter, collector and base electrodes, a first resistor a direct current conductive circuit path, connecting the collector electrode of said first transistor with the emitter electrode of said second transistor, said first resistor being included in series in said circuit path, means for applying a supply voltage across the series arrangement of said first and second transistors and said first resistor, means for applying input signals to the base electrode of said first transistor thereby producing a signal voltage across said first resistor, a direct voltage variation being produced across said first resistor by direct collector current variation in said first transistor, a second resistor, means connecting the base electrode of said second transistor to the collector electrode of said first transistor directly through said second resistor, a third resistor connected to the base electrode of said second transistor, means for applying a supply voltage to said third resistor, a fourth resistor connected in series with said second resister, and means connecting the base electrodes of said first and second transistors through the series connection of said second and fourth resistors, and means for deriving an output signal from the emitter collector path of said second transistor.

5. An amplifier circuit arrangement comprising first and second transistors of the same conductivity type each having emitter, collector and base electrodes, a first resistor a direct current conductive circuit path, connecting the collector electrode of said first transistor with the emitter electrode of said second transistor, said first resistor being included in series in said circuit path, means for applying a supply voltage across the series arrangement of said first and second transistors and said first resistor, means for applying input signals to the base electrode of said first transistor thereby producing a signal voltage across said first resistor, a direct voltage variation being produced across said first resistor by direct collector current variation in said first transistor, a second resistor, means connecting the base electrode of said second transistor to the collector electrode of said first transistor directly through said second resistor, a third resistor connected to the base electrode of said second transistor, means for applying a supply voltage to said third resistor, a fourth resistor connected in series with said second resistor, and means connecting the base electrodes of said first and second transistors through the series connection of said second and fourth resistors, said second and fourth resistors having substantially equal resistance values, and means for deriving an output signal from the emitter collector path of said second transistor.

References Cited in the file of this patent

UNITED STATES PATENTS

| | | |
|---|---|---|
| 2,310,342 | Artzt | Feb. 9, 1943 |
| 2,474,435 | Moore | June 28, 1949 |
| 2,666,817 | Raisbeck | Jan. 19, 1954 |
| 2,789,164 | Stanley | Apr. 16, 1957 |
| 2,802,907 | Peterson | Aug. 13, 1957 |

FOREIGN PATENTS

| | | |
|---|---|---|
| 1,075,579 | France | Oct. 18, 1954 |
| 724,682 | Great Britain | Feb. 23, 1955 |
| 1,088,800 | France | Mar. 10, 1955 |